United States Patent
Alter et al.

(10) Patent No.: US 12,122,500 B2
(45) Date of Patent: Oct. 22, 2024

(54) SANDWICH-COMPOSITE COMPONENT FOR AIRCRAFT INTERIORS

(71) Applicant: Euro-Composites S.A., Echternach (LU)

(72) Inventors: Rolf-Mathias Alter, Echternach (LU); Willy Wintgens, Troisvierges (LU); Frank Koch, Trier (DE)

(73) Assignee: Euro-Composites S.A., Echternach (LU)

( * ) Notice: Subject to any disclaimer, the term of this patent is extended or adjusted under 35 U.S.C. 154(b) by 501 days.

(21) Appl. No.: 17/270,012

(22) PCT Filed: Nov. 26, 2019

(86) PCT No.: PCT/EP2019/082643
§ 371 (c)(1),
(2) Date: Feb. 20, 2021

(87) PCT Pub. No.: WO2020/109342
PCT Pub. Date: Jun. 4, 2020

(65) Prior Publication Data
US 2021/0323651 A1    Oct. 21, 2021

(30) Foreign Application Priority Data

Nov. 26, 2018  (LU) .......................... 101019

(51) Int. Cl.
| | |
|---|---|
| *B64C 1/06* | (2006.01) |
| *B32B 5/02* | (2006.01) |
| *B32B 5/18* | (2006.01) |
| *B32B 5/24* | (2006.01) |
| *B32B 7/12* | (2006.01) |

(Continued)

(52) U.S. Cl.
CPC .............. *B64C 1/066* (2013.01); *B32B 5/024* (2013.01); *B32B 5/18* (2013.01); *B32B 5/245* (2013.01); *B32B 7/12* (2013.01); *B32B 15/14* (2013.01); *B32B 15/20* (2013.01); *B32B 27/12* (2013.01); *B32B 27/40* (2013.01); *B32B 2260/021* (2013.01); *B32B 2260/046* (2013.01); *B32B 2262/101* (2013.01); *B32B 2266/0278* (2013.01); *B32B 2307/102* (2013.01); *B32B 2307/304* (2013.01); *B32B 2307/3065* (2013.01); *B32B 2307/718* (2013.01); *B32B 2307/72* (2013.01); *B32B 2605/003* (2013.01); *B32B 2605/18* (2013.01); *B64C 2001/0072* (2013.01)

(58) Field of Classification Search
CPC ....... B29C 70/086; B29C 70/70; B29C 70/88; B29D 99/0021; B29L 2031/3076; B32B 15/082; B32B 15/14; B32B 15/20; B32B 2250/40; B32B 2260/021; B32B 2260/046; B32B 2262/101; B32B 2266/0228; B32B 2266/0235; B32B 2266/025; B32B 2266/0264; B32B 2266/0278; B32B 2307/102; B32B 2307/304; B32B 2307/3065; B32B 2307/718; B32B 2307/72; B32B 2307/732; B32B 2605/003; B32B 2605/18; B32B 27/12; B32B 27/304; B32B 27/322; B32B 27/40; B32B 3/266; B32B 5/024; B32B 5/18; B32B 5/245; B32B 5/32; B32B 7/02; B32B 7/12; B64C 1/066; B64C 2001/0072; B64D 11/00; Y02T 50/40
See application file for complete search history.

(56) References Cited

U.S. PATENT DOCUMENTS

| | | |
|---|---|---|
| 4,759,964 A | 7/1988 | Fischer et al. |
| 5,806,796 A | 9/1998 | Healey |

(Continued)

FOREIGN PATENT DOCUMENTS

| | | |
|---|---|---|
| CN | 101130290 A | 2/2008 |
| CN | 101454634 A | 6/2009 |

(Continued)

OTHER PUBLICATIONS

European Patent Office, English translation of the International Preliminary Report on Patentability for PCT App. No. PCT/EP2019/082643, Nov. 23, 2020, pp. 1-6.

(Continued)

*Primary Examiner* — Hai Vo
(74) *Attorney, Agent, or Firm* — Cahn & Samuels, LLP

(57) ABSTRACT

The invention relates to a sandwich composite component (1) for the interior of a passenger aircraft. One problem to be solved by the invention is that of proposing a cost-effectively produced sandwich composite component which is suitable for the interior of a passenger aircraft and fulfils current fire protection requirements. The layer structure of the sandwich composite component (1) according to the invention comprises: a core layer (10) made of polymer foam; a reinforcing layer (20) comprising fiber composite material; and in addition at least one functional layer (50); wherein said layers of the layer structure are integrally bonded to each other, in particular by an adhesive bond. The fiber composite material of the reinforcing layer (20) comprises a woven or laid fabric made of reinforcing fibers and a polymer matrix, which has a higher density than the polymer foam of the core layer (10). Furthermore, the at least one functional layer (50) comprises a metal foil, in particular an aluminium foil, which has a thinner layer thickness than the reinforcing layer (20).

20 Claims, 2 Drawing Sheets

Figure 1:
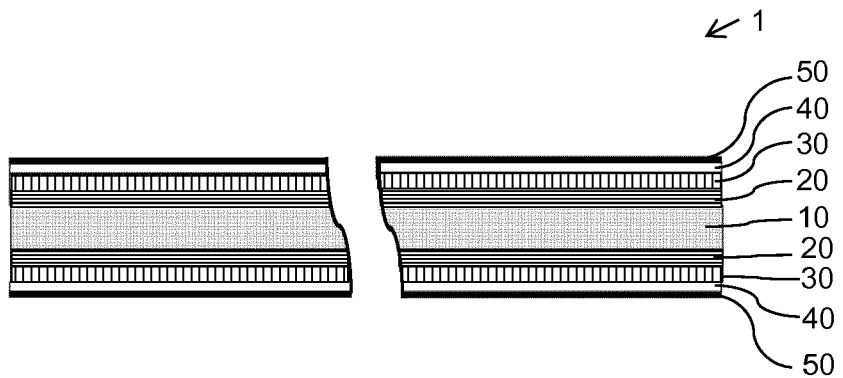

(51) Int. Cl.
  *B32B 15/14* (2006.01)
  *B32B 15/20* (2006.01)
  *B32B 27/12* (2006.01)
  *B32B 27/40* (2006.01)
  *B64C 1/00* (2006.01)

(56) References Cited

U.S. PATENT DOCUMENTS

| | | |
|---|---|---|
| 9,527,230 B2 | 12/2016 | Takeuchi et al. |
| 9,782,944 B2 | 10/2017 | Martin et al. |
| 2007/0207301 A1 | 9/2007 | Hanks et al. |
| 2009/0025873 A1 | 1/2009 | Hanks et al. |
| 2010/0021718 A1 | 1/2010 | Vos et al. |
| 2012/0237759 A1* | 9/2012 | Ehbing ............... B32B 5/08 156/60 |
| 2014/0205820 A1 | 7/2014 | Savonuzzi et al. |
| 2015/0004864 A1 | 1/2015 | Roers et al. |
| 2015/0210035 A1* | 7/2015 | Rippel ............... B32B 5/026 428/218 |
| 2017/0182751 A1 | 6/2017 | Du et al. |

FOREIGN PATENT DOCUMENTS

| | | |
|---|---|---|
| CN | 102555329 A | 7/2012 |
| CN | 104245282 A | 12/2014 |
| CN | 105799285 A | 7/2016 |
| DE | 3625534 A1 | 2/1988 |
| EP | 1060070 B1 | 6/2003 |
| EP | 2522502 A1 | 11/2012 |
| EP | 2777926 A1 | 9/2014 |
| FR | 2560953 A1 | 9/1985 |
| WO | 9206845 A1 | 4/1992 |
| WO | 9944811 A1 | 9/1999 |
| WO | 2007115057 A1 | 11/2007 |
| WO | 2013/113734 A1 | 8/2013 |
| WO | 2015096831 A1 | 7/2015 |
| WO | WO-2020106678 A1 * | 5/2020 ........... B29C 70/026 |

OTHER PUBLICATIONS

European Aviation Safety Agency, "Certification Specifications and Acceptable Means of Compliance for Large Aeroplanes CS-25 Amendment 23," Jul. 15, 2019, Annex I to ED Decisions 2019/013/R, pp. 138-139 (CS 25.853) and 260-267 (App F-18 to App F-25)(Appendix F, Part IV).
European Patent Office, English Abstract of EP2777926 A1, printed on Feb. 20, 2021.
Espacenet, English Abstract of FR2560953 A1, printed on Feb. 19, 2021.
European Patent Office, International Search Report for PCT App. No. PCT/EP2019/082643, Aug. 8, 2013, pp. 1-3.
Chinese Patent Application 201980063427, Office Action, Dec. 20, 2022, pp. 1-9.
Chinese Patent Office, English Abstract for CN101130290A, printed Feb. 27, 2008.

* cited by examiner

SANDWICH-COMPOSITE COMPONENT FOR AIRCRAFT INTERIORS

I. FIELD OF THE INVENTION

The invention relates to a sandwich composite component, in particular a composite board, which is suitable for the interior of an aircraft, in particular of a passenger aircraft.

II. BACKGROUND OF THE INVENTION

Sandwich composite components with advantageous primary fire properties (such as, e.g., combustibility, flammability, flame propagation) are known e.g. from building construction. As an example, WO 2013/113734 A1 discloses a sandwich composite component comprising a layer structure in a sandwich construction with two cover layers, a core layer made of polymer foam and a glass fiber mat, which is embedded in the polymer foam.

A further sandwich composite component with advantageous primary fire properties for the construction industry or for building construction is known from EP 2 777 926 A1. This comprises a layer structure in a sandwich construction (see FIG. 1 thereof) with two functional layers made of metal (A1, A2), a fire protection layer (B), an insulating inner core layer made of polymer foam (D) and an additional fire protection layer (C) comprising a fiber composite material with dispersed chopped fibers, wherein the layers are integrally bonded to each other. This component is said to achieve good results in a fire resistance test for buildings (according to standard EN1363-1).

Known sandwich composite components with a foam core can already be produced cost-effectively and are typically used in building construction or in the construction industry. However, they are not suitable or have only limited suitability for special applications or applications with stricter requirements.

In aviation in particular, apart from particularly favorable primary fire properties there are also in some cases significantly more stringent requirements relating to fire side effects or secondary fire properties, in particular smoke density and/or smoke toxicity. The aviation sector also has particular requirements for low weight per unit area combined with high strength.

High-grade honeycomb panels for aviation applications, which are suitable for the interior of a passenger aircraft, are already known. They are typically produced in a sandwich construction and, as well as fiber composite cover layers, contain, e.g., phenolic resin-impregnated honeycomb structures made of aramid fibers as a core layer for weight reduction.

DE 36 25 534 A1 discloses such a sandwich panel with a honeycomb core which is intended primarily for flooring in aircraft. For this purpose, a layer structure in a sandwich construction is proposed with two cover layers made of fiber composite and a core of a honeycomb-type material, which is covered on both sides by the fiber composite. DE 36 25 534 A1 proposes the arrangement of a comparatively thin metal foil, in particular an aluminium foil, as an insulating layer between two sub-layers within the cover layers. This design is said to reduce combustibility, smoke density and toxicity of the smoke gases compared to previously known constructions.

The production of such panels with a honeycomb core is, however, technically complex and therefore relatively cost-intensive.

III. SUMMARY OF THE INVENTION

It is therefore an object of the present invention to propose a cost-effectively produced sandwich composite component that is suitable for the interior of an aircraft, in particular a passenger aircraft.

This object is already achieved in a simple embodiment by a sandwich composite component having the features according to a sandwich composite component 1, in particular a composite board, for the interior of a passenger aircraft, comprising a layer structure in a sandwich construction having a core layer 10 made of polymer foam; a reinforcing layer 20 comprising fiber composite material; and at least one functional layer 50; wherein these layers of the layer structure are substance bonded to each other, in particular by an adhesive bond; characterised in that the fiber composite material of the reinforcing layer 20 comprises a woven fabric made of fibers or a laid fabric made of fibers, and in that the fiber composite material of the reinforcing layer 20 comprises a polymer matrix that has a higher density than the polymer foam of the core layer 10, and in that the at least one functional layer 50 comprises a metal foil, preferably an aluminium foil, that has a smaller layer thickness than the reinforcing layer 20.

Advantageous developments can be taken from at least one embodiment of the invention.

The sandwich composite component comprises a layer structure in a sandwich construction with a core layer made of polymer foam, a reinforcing layer comprising fiber composite material and, in addition, at least one functional layer, wherein said layers of the layer structure are bonded to each other integrally or by an adhesive bond.

According to the invention, a combination of measures is provided. On the one hand, the fiber composite material of the reinforcing layer comprises a polymer matrix that has a higher density than the polymer foam of the core layer. On the other hand, the at least one functional layer of the sandwich composite component according to the invention comprises a relatively thin metal foil, in particular an aluminium foil. The combination of these two measures which, in retrospect, appear ostensibly simple already makes it possible to achieve both the required fire properties, in particular secondary fire properties, and a favorable ratio of strength to weight per unit area, despite its cost-effective production with a foam core. The functional layer here can in particular have a thinner, preferably significantly thinner, layer thickness than the reinforcing layer.

The fiber composite material comprises reinforcing fibers, in particular a woven or laid fabric made of suitable technical fibers, wherein the reinforcing fibers are embedded in the polymer matrix in the finished fiber composite material.

The density of the polymer matrix here refers to the density of the matrix itself without the reinforcing fibers of the fiber composite. This density of the polymer matrix in the finished fiber composite material can be determined, e.g., by burning a sample of the fiber composite material having a specific volume and a specific weight (the weight reduction that occurs as a result of burning the sample corresponding to the weight of the matrix).

The sandwich composite component according to the invention for aviation applications has a particularly low weight per unit area, in particular <2.5 kg/m$^2$, preferably <2 kg/m$^2$, particularly preferably <1 kg/m$^2$, and yet offers high strength. The strength can be flexibly adapted or adjusted by the configuration and the layer thicknesses, in particular of the reinforcing layer(s), according to customer requirements.

The sandwich composite component according to the invention can therefore be in particular an aircraft interior composite panel or an aircraft interior composite board, or can represent a core component thereof.

The core layer made of polymer foam has good insulation properties, in particular thermal insulation properties. The functional layer made of metal foil makes it possible to use particularly cost-effective core layers made of polymer foam.

The sandwich composite component can in particular be produced in the form of a flat composite board or have a planar configuration. The sandwich composite component can be, e.g., a smooth panel. However, the sandwich composite component does not have to be level but can have, e.g., a predefined curvature or optionally a plurality of curvatures or a more complex geometry in general.

The mutually adjacent layers of the layer structure are all integrally bonded to each other, i.e., in particular such that they cannot be separated non-destructively, in particular by a suitable adhesive bond.

The core layer made of polymer foam can in particular be prefabricated and supplied to the production process, e.g., as a commercially available semi-finished product.

The provision of at least one metal foil layer externally to the core layer made of polymer foam, but otherwise at any position in the layer structure, can in particular markedly reduce or entirely prevent the release of toxic substances, such as smoke gases etc., that could be emitted from the core layer in the event of a fire or severe heat development.

Thanks to the combination of a force-absorbing reinforcing layer, whose composition can be selected to suit the particular application, and a metal foil that has advantageous effects particularly with regard to secondary fire properties, the sandwich composite component according to the invention can be produced cost-effectively and yet be suitable for the stricter aviation requirements for use in the interior of a passenger aircraft.

The functional layer with a metal foil allows in particular surprisingly good results with regard to the valid smoke gas requirements, which otherwise could not be achieved with typical foam cores, or could be achieved only with very costly additional measures.

The sandwich composite component according to the invention in particular meets the fire protection requirements for aircraft interior materials with regard to the required low flammability, smoke density and/or heat release according to EASA specification. Furthermore, the sandwich composite component according to the invention can be self-extinguishing. The heat release, the heat release rate and the smoke density are relevant parameters for assessing the reaction of the components to high temperatures or fire. The standard specifications on type approval for large aeroplanes are considered to be CS-25 from the European Union Aviation Safety Agency (EASA), for large, turbine-powered aeroplanes, or Part 25 "Airworthiness Standards: Transport Category Airplanes" of the U.S. Department of Transportation FAR (Federal Aviation Administration regulations). The European standard largely corresponds to the American standard and describes minimum requirements that must be met for the certification of an aeroplane of this class. As well as the EASA specification, the sandwich composite component according to the invention can equally meet the requirements of the above-mentioned American regulations. Paragraph 25.853 of the EASA standard CS-25 defines various fire protection requirements for interior materials of an aircraft, relating in particular to the flammability, the heat release, the heat release rate, and the also smoke emission properties. Similar requirements are set out by the U.S. Federal Aviation Administration in the Federal Aviation Regulations (FAR).

The sandwich composite component according to the invention can in particular meet the requirements according to EASA specification CS 25.853 (d) relating to the heat release and the heat release rate, and preferably has a heat release rate HRR of $\leq 65$ kW/m$^2$ and a heat release HR of $\leq 65$ kW*min/m$^2$ determined according to CS 25.853 (d) and Appendix F, Part IV.

The sandwich composite component can have an average heat release rate HRR of $\leq 45$ kW/m$^2$ and/or an average heat release HR of $\leq 40$ kW*min/m$^2$, the heat release rate and the heat release being determined according to CS 25.853 (d) and Appendix F, Part IV.

With regard to smoke emission properties, the sandwich composite component can have an average specific optical smoke density Ds of <100 after 4 min., the specific optical smoke density Ds being determined according to ASTM test method F814-83.

Low smoke emission is particularly important for materials used in interior areas of a passenger aircraft used by passengers and/or crew. Smoke inhalation injury represents one of the most common causes of death in fires.

The polymer foams proposed as the sandwich core according to the invention can, however, comprise flame retardants or flame inhibitors, e.g. halogenated flame retardants, and/or can be treated with flame retardants. Although on the one hand the flame retardants make it possible to meet the valid fire protection requirements with regard to flammability, on the other hand they make a significant contribution to smoke development and/or associated smoke toxicity. The provision according to the invention of a metal foil layer externally to the core layer made of polymer foam can markedly reduce or prevent the release of any smoke gases, such that the fire protection requirements for interior materials are also met with regard to smoke density.

Surprisingly, the combination of a reinforcing layer whose polymer matrix has a higher density than the polymer foam of the core layer, and a functional layer made of a metal foil, which preferably has a thinner layer thickness than the reinforcing layer, already makes it possible to achieve the above-mentioned fire protection properties necessary for aviation while at the same time maintaining the mechanical requirements (see ratio of strength to weight per unit area).

The reinforcing layer can be arranged between the functional layer and the core layer in the layer structure. The layer structure can additionally comprise further layers between the functional layer and the core layer. It is likewise possible to arrange the functional layer directly adjacent to the core layer.

In one embodiment, the layer structure can further comprise a separating layer comprising a thermoplastic material. The separating layer can be a film made of, e.g., polyester, polycarbonate, polyetherimide (PEI), polyphenyl sulfide (PPS), and/or polyether ether ketone (PEEK). In this case, the separating layer can in particular comprise a halogenated thermoplastic material, preferably a fluoroplastic ply, particularly preferably a ply made of polyvinyl fluoride. A separating layer of this type improves adhesion between the functional layer made of metal foil and the reinforcing layer made of fiber composite material, which comprises a polymer matrix with particularly advantageous fire behavior, e.g., a phenolic resin matrix. During manufacture, fumes are emitted when the phenolic resin matrix is curing which make it more difficult for the reinforcing layer to bind to the functional layer. The separating layer can effectively block the interfering effect of these fumes and thus act as a type of compatibility layer. The separating layer can thus facilitate the production of the sandwich composite component, e.g. in a hot press, and/or improve the adhesive bond between the reinforcing layer and the core layer. The provision of a separating layer of this type is additionally advantageous for achieving the fire properties required for aviation. The separating layer made of, e.g., a halogenated material itself exhibits advantageous fire behavior. The separating layer can be treated with flame retardant or flame inhibitor.

In one embodiment, the separating layer can be arranged between the reinforcing layer and the functional layer. The separating layer made of a thermoplastic material may optionally also be used as a cover layer or decorative layer for the sandwich composite component.

The functional layer made of metal foil can in particular be bonded to the separating layer by at least one adhesive ply, preferably an adhesive film. The adhesive film can be thermoplastic or thermoset and/or treated with a flame retardant or a flame inhibitor.

The functional layer can consist of a metal foil. The functional layer can in particular consist of a non-structural metal foil, in particular with a thickness of between 7 μm and 300 μm, preferably between 7 and 100 μm, particularly preferably between 50 and 90 μm. An aluminium foil is preferably used as the metal foil, in particular an aluminium foil with a coating. The coating can be inorganic. The metal foil can be a composite foil, which is in turn made up of two or more individual layers. The composite foil can comprise a coating on at least one side, which allows bonding to matrix materials. The functional layer can contribute to favorable fire properties.

The functional layer can also have a mechanically supporting or load-bearing function. The functional layer can increase the breaking strength and reduce the deflection of the sandwich composite component under bending load, in particular by approximately 10-30%.

The core layer is preferably prefabricated as a rigid foam board or rigid integral foam board and integrated into the layer structure. The fabrication of the core layer can be carried out under conditions that are advantageous specifically for curing foam, and can differ from conditions for the production of further, or the remaining, layers. This allows a core layer with specific, required properties to be provided in the layer structure.

The rigid foam board can be coated with an adhesion promoter or primer, which serves to improve bonding to the adjacent layers.

The core layer or its polymer foam can comprise flame retardants or flame inhibitors, in particular bromide- or chloride-based halogenated flame retardants, such as, e.g., pentabromodiphenyl ether, tetrabromobisphenol A, or HBCD (hexabromocyclododecane). Further flame retardants or flame inhibitors can comprise, e.g., chlorine compounds or organochlorine compounds, ATH, magnesium hydroxide and/or silicates. Phosphorus-based flame retardants, such as, e.g., phosphorus, polyphosphates and pyrophosphates, zinc phosphates, phosphonates and/or phosphinates, are also suitable.

The core layer itself can in particular have a density of ≤400 kg/m$^3$, in particular of 20 to 300 kg/m$^3$, preferably of 40 to 150 kg/m$^3$, particularly preferably 40 to 100 kg/m$^3$, in particular of 40 to 80 kg/m$^3$.

In a particularly preferred embodiment, the core layer is made from polyurethane foam, in particular PUR and/or PIR. Polyurethane foam has low thermal conductivity and particularly good thermal insulation properties, in particular because it can contain cell gases, such as, e.g., carbon dioxide, which have lower thermal conductivity than air. A polyurethane foam with a small pore diameter can counteract an emission of gases or fumes. Polyurethane foam is also particularly cost-effective. Not only but in particular in the case of polyurethane foam, a rigid foam or integral foam can be used.

Alternatively or in addition, the core layer can be produced using a PVC, PET, EPS, PE and/or PMI foam. These substances or foams also exhibit advantageous fire properties, in particular advantageous primary fire properties, depending on their composition. The core layer can comprise or be made from expanded glass or expanded graphite.

The core layer can also be made from or consist of, e.g., a combination of two or more foams, preferably selected from: polyurethane, in particular PUR and/or PIR, and PVC, PET, EPS, PE and/or PMI foams. In this case a combination comprising polyurethane foam, in particular PUR and/or PIR foam, is preferred.

The core layer can further comprise fillers. The density of the core layer can be adjusted, e.g., by suitable fillers.

The layer structure can comprise on one side of the core layer the at least one functional layer as a first functional layer and preferably the reinforcing layer as a first reinforcing layer, and on the other side of the core layer a second functional layer and preferably a second reinforcing layer. The first and second functional layers in this case can both consist of an aluminium foil. The aluminium foil can have a thinner layer thickness than the first reinforcing layer. The first and second reinforcing layers can preferably be technically identical. In principle, a layer structure which is mirror-symmetrical in relation to the mid-level of the core layer is preferably used.

In a preferred embodiment, at least one functional layer made of metal foil is provided on each side of the core layer.

In a further embodiment, the layer structure comprises at least two functional layers of metal foil on at least one side of the core layer.

The reinforcing layer can comprise a matrix made of phenolic resin and/or benzoxazine resin, and in particular also of other resins having a flame inhibiting action or treated so as to be flame-inhibiting. These resins have advantageous fire properties. The matrix made of benzoxazine resin is particularly suitable for high application temperatures, and exhibits high fire resistance. Benzoxazine resin cures without releasing volatile substances, and so the matrix does not interfere with bonding to a metal foil and it may also be the case that no separating layer is necessary for blocking volatile substances, e.g., during production.

Alternatively or in addition, the matrix of the reinforcing layer can comprise, e.g., polyester resin, cyanate ester resin, epoxy resin, furfuryl resin and/or a combination of these resins.

A thermoplastic matrix is also possible, in principle, for the production of the reinforcing layer.

Various resins systems can be combined in the matrix of the reinforcing layer. The matrix in turn can likewise comprise a flame retardant or a flame inhibitor.

The reinforcing layer is preferably made from a composite with glass fibers. The matrix of the reinforcing layer can comprise phenolic resin, benzoxazine resin, cyanate ester resin, epoxy resin, or can be made from a mixture of a selection of these resins. Glass fiber reinforced composites with a phenolic resin matrix, for example, are particularly cost-effective. However, carbon fiber reinforced or basalt fiber reinforced composites are likewise suitable as the reinforcing layer.

Preferably, the reinforcing layer is made from a prefabricated prepreg or textile fiber/matrix semi-finished product, e.g., a resin-preimpregnated woven or laid fabric. Prepregs are technically beneficial particularly for producing larger quantities, since they allow shorter production times or cycle times and are easy to handle and store. The prepreg can comprise a matrix made of phenolic resin, benzoxazine resin, cyanate ester resin, epoxy resin or a mixture of at least two of these resins. Preferably, the prepreg comprises glass fibers as reinforcing fibers, in particular exclusively glass fibers. A high-temperature prepreg that is capable of being stored at ambient temperature for a certain period may be employed if appropriate.

The thickness of the reinforcing layer can be discernibly greater than 150 μm, typically greater than 300 μm, generally >0.5 mm.

In one embodiment, the metal foil, in particular aluminium foil, of the functional layer has perforations. The perforations should have a diameter of <10 mm, preferably <2 mm, particularly preferably <1 mm. Perforations can facilitate production and be used for ventilation during application of the film, so that any air pockets between the metal foil and the layer on which it is applied can escape during production of the sandwich composite component. Preferably, the perforations are uniformly or regularly distributed over the surface in the two axial directions. The perforations should be provided according to grid dimensions of >>10 mm, which are very wide-meshed in relation to the diameter of the perforations, e.g. forming a grid of >20*20 mm, and in particular 50*50 mm.

In a particularly preferred embodiment of the sandwich composite component, the layer structure has the following layer sequence:
 a first functional layer made of aluminium foil;
 an adhesive ply, preferably made of a thermoset;
 a first separating layer comprising a thermoplastic layer, in particular a fluoroplastic ply, preferably a ply made of polyvinyl fluoride;
 a first reinforcing layer made of fiber composite, in particular of prefabricated prepreg;
 an inner core layer made of polymer foam,
 a second reinforcing layer made of fiber composite, in particular of prefabricated prepreg;
 a second separating layer comprising a thermoplastic layer, in particular a fluoroplastic ply, preferably a ply made of polyvinyl fluoride;
 an adhesive ply, preferably made of a thermoset;
 a second functional layer made of aluminium foil;
these layers of the layer structure being integrally bonded to each other by a suitable technique, in particular by an adhesive bond. The resulting sandwich composite component has a low weight per unit area despite high strength, and exhibits advantageous fire properties or fire behavior. In particular, a sandwich composite component of this type can at least meet, or can exceed, the valid fire protection requirements for interior materials for wide-bodied aircraft. Furthermore, the sandwich composite component has advantageous thermal and sound insulation properties.

The invention further relates to the use of the sandwich composite component in the interior area of a passenger aircraft used by passengers and/or crew. Owing to its good insulation properties, the sandwich composite component can in particular be used for the construction of air-carrying structures, e.g. for interior air conditioning, in aircraft.

IV. BRIEF DESCRIPTION OF THE DRAWINGS

Figure 2:
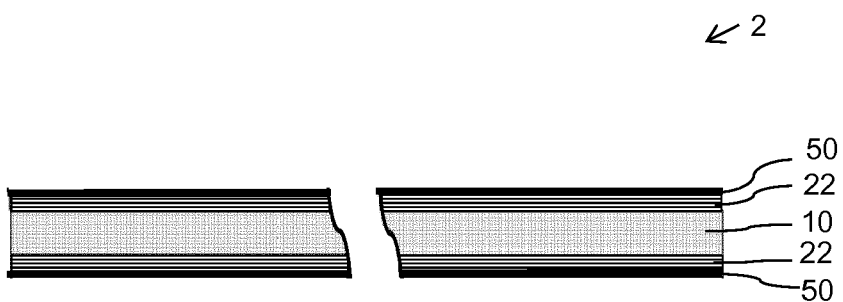
Figure 3:
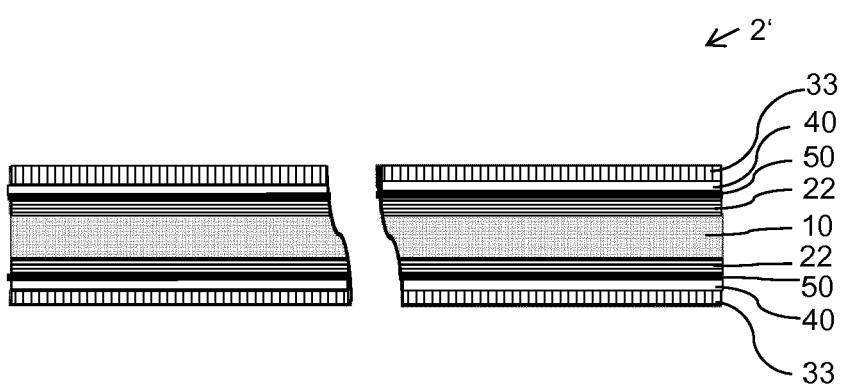
Figure 4:
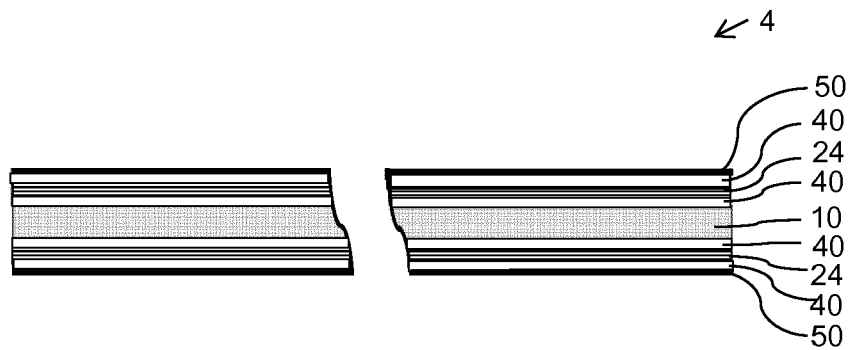
Figure 5:
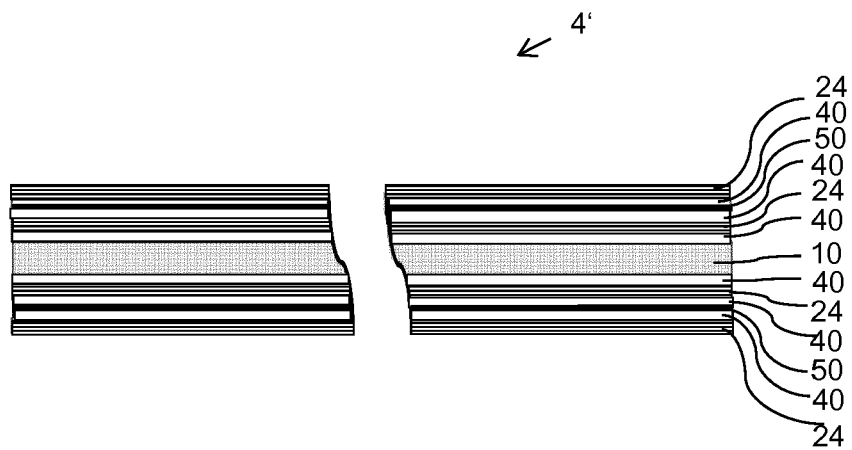
Figure 6:
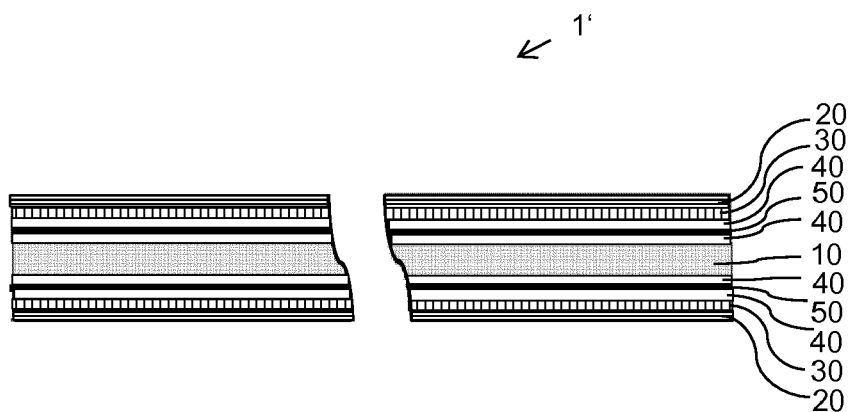

Further details, features and advantages of the invention can be taken—without restricting the generality of the above-mentioned features—from the following, more detailed description of preferred exemplary embodiments with reference to the attached drawings. These show, in a schematic diagram in each case, a partial vertical section of:

FIG. 1: a first embodiment of the sandwich composite component according to the invention;

FIG. 2: a second embodiment of the sandwich composite component according to the invention;

FIG. 3: a third embodiment of the sandwich composite component according to the invention;

FIG. 4: a fourth embodiment of the sandwich composite component according to the invention;

FIG. 5: a fifth embodiment of the sandwich composite component according to the invention; and FIG. 6: a sixth embodiment of the sandwich composite component according to the invention.

V. DETAILED DESCRIPTION OF THE DRAWINGS

FIG. 1 is a schematic view of a first embodiment of the sandwich composite component 1 according to the invention. The illustrated sandwich composite component 1 is a flat panel with a layer structure that is mirror-symmetrical to the mid-level in cross-section. The layer structure comprises an inner core layer 10, which is arranged between two reinforcing layers 20. On the outside of each reinforcing layer 20, a separating layer 30 is arranged. On the outside of each separating layer 30, an adhesive ply 40 and a functional layer 50 are located, the adhesive ply 40 integrally bonding each functional layer 50 to the adjacent separating layer 30.

The core layer 10 in FIG. 1 is in the form of a prefabricated rigid foam board made of polyurethane foam, and preferably has a density of approx. 40 to 80 kg/m$^3$. The rigid foam board can comprise additional plies made of aluminium foil, one on each side, each having a thickness of between 50 μm and 90 μm (not shown). The core layer 10 has a significantly greater layer thickness or wall thickness in the transverse direction than each of the other layers and in particular keeps the two reinforcing layers 20 at a distance from each other according to the sandwich principle. The core layer can have a layer thickness of, e.g., 10 mm. Thanks to the core layer 10 made of PU foam, the sandwich composite component 1 also provides heat and sound insulation.

The two reinforcing layers 20 are technically identical and comprise a glass fiber composite with a phenolic resin matrix, wherein the proportion by weight of the matrix in the composite is, e.g., approximately 50%. The thickness of the reinforcing layers 20 here is discernibly greater than 150 μm, typically greater than 300 μm, generally mm. The reinforcing layers 20 are the mechanically load-bearing layers of the layer structure and are responsible for the high strength of the sandwich composite component 1. The density of the matrix per se can be approximately 1200 kg/m$^3$, and the density of the reinforcing fibers per se approximately 2400 kg/m³. The combined density of the composite material of the reinforcing layer 20 lies between the two values and can be approximately 1800 kg/m³ with a proportion by weight of approximately 50%. Low-density reinforcing fibers, such as, e.g., carbon, cotton, viscose, thermoplastic and/or high-performance thermoplastic fibers can likewise be employed. The combined density of the composite material in this case can be lower than 1800 kg/m³.

The two separating layers 30 are likewise technically identical and comprise a film made of polyvinyl fluoride. The preferred product example according to Table 1 comprises Tedlar® TWH10BE 3 (DuPont, USA) as the polyvinyl fluoride film.

The two fire-protecting functional layers 50 are likewise identical, and in FIG. 1 they consist of an aluminium foil. The thickness of the aluminium foil is between 7 μm and 90 μm, e.g., 50 μm. An alloy from the 5xxx series according to EN 573-3/4, e.g. alloy 5052, is preferably employed as the aluminium foil. To facilitate production, the aluminium foil or functional layers 50 may have perforations with a diameter of <2 mm in a grid arrangement with a square grid dimension of approximately 20-25 mm. The aluminium foil of the functional layer 50 is non-structural in the mechanical sense. It contributes surprisingly effectively to improving the properties of the sandwich composite component 1, in particular the secondary fire properties, in the event of a fire. In FIG. 1, the aluminium foil represents the outer layer of the layer structure.

The layers of the layer structure are bonded to each other in a manner that is known per se, wherein, e.g., adhesive plies 40 made of a thermosetting resin or thermoset can be used.

The sandwich composite component 1 is preferably produced cost-effectively by a suitable press method, in particular by pressing the layer structure and curing in a hot pressing technique. This method is particularly advantageous if the sandwich composite component 1 is planar, and prefabricated reinforcing layers 20 in the form of prepregs are used. In the exemplary embodiment according to FIG. 1, prepregs were used for producing the reinforcing layers 20. The layers of the layer structure are laid in the above sequence and introduced into a hot press, where they are pressed together and cured in one step. The prepreg layers cure under the action of heat and integrally bond to the adjacent foam core 10 and the polyvinyl fluoride film 30. The adhesive plies 40 likewise cure and bond the polyvinyl fluoride film 30 to the aluminium foil 50. The layer structure, which may have been only pre-cured, can be completely cured by a subsequent thermal treatment in an oven at a temperature of up to 250° C., at which both the adhesive ply 40 and the matrix of the reinforcing layers 20 are completely cured.

It is likewise possible initially to prepare a laminate from the prepreg of the reinforcing layer 20, the polyvinyl fluoride film of the separating layer 30, the adhesive ply 40 and the aluminium foil of the functional layer 50 by hot pressing, and in the next step to bond said laminate to the core layer 10, e.g., a prefabricated rigid foam board.

For non-planar components in particular, a prefabricated rigid foam board of the core layer 10 can be placed in an open mold, a glass fiber layer laid on top of the rigid foam board and the arrangement covered with a polyvinyl fluoride film of the separating layer 30. Negative pressure is then generated under a film, e.g., approximately a 75-90% vacuum. A liquid matrix for the reinforcing layer 20 can in this case be introduced by resin infusion between the separating layer 30 and the core layer 10 under the effect of the vacuum, such that the glass fibers are impregnated with the resin and excess resin is removed by suction. The matrix can cure partially or completely at ambient temperature. If necessary, the matrix of the reinforcing layer 20 can be completely cured by a subsequent thermal treatment in an oven at an elevated temperature, up to approximately 250° C. In a further alternative production method, the reinforcing layer 20 can first be produced in a closed mold in a vacuum injection process or an RTM process. The mold can be heated in an oven or autoclave. Furthermore, the reinforcing layer 20 can also be produced by hand lay-up.

The suitably prefabricated reinforcing layer 20 with optional separating layer can then be bonded by a suitable technique to a prefabricated core layer 10 and the functional layers 50 to form the finished sandwich composite component 1. A not yet completely cured semi-finished product comprising the layer structure described above can also be bent to a desired shape and may be cured by a hot curing method. The production technique and the order in which the layers are produced are not important, in principle.

Technical data for a product example are given in the table below according to the layer sequence:

TABLE 1

(technical data for product example)
Product example: sandwich composite board for the interior of a passenger aircraft

| Layer | Type |
| --- | --- |
| Functional layer | Aluminium foil, layer thickness 50 μm, with perforations |
| Adhesive ply | Epoxy-based adhesive |
| Separating layer | Polyvinyl fluoride film |
| Reinforcing layer | GFRP: glass fiber reinforced composite with phenolic resin matrix (prepreg), approximately 50% fiber content, layer thickness 0.5 mm |
| Core layer | Rigid foam board made of PUR foam, layer thickness 10 mm |
| Reinforcing layer | GFRP: glass fiber reinforced composite with phenolic resin matrix (prepreg), approximately 50% fiber content, layer thickness 0.5 mm |
| Separating layer | Polyvinyl fluoride film |
| Adhesive ply | Epoxy-based adhesive |
| Functional layer | Aluminium foil, layer thickness 50 μm, with perforations |

A sandwich composite component 1 constructed according to FIG. 1 and with the data according to Table 1 can in particular meet or exceed the fire protection requirements for aircraft interior materials according to EASA specification CS 25.853 a, d.

Tests on a sandwich composite component 1 produced according to FIG. 1 and Table 1 gave the following results:
the sandwich composite component 1 has a heat release rate HRR of 39.9 kW m² and a heat release of 23.3 kW min m² (determined according to the provisions of Appendix F, Part IV of EASA specification CS 25);
the sandwich composite component 1 according to FIG. 1 has a specific optical smoke density Ds=56 after 4 min. (determined according to ASTM test method F814-83); and
the sandwich composite component 1 has an average flame time of 3 s after removal of the flame source, an average burn length of 43 mm and an average flaming time of drippings of 0 s, or none (each determined according to the provisions of CS 25.853 a and Appendix F, Part I of EASA specification with a vertical test arrangement).

FIG. 2 is a second possible embodiment of the sandwich composite component 2 according to the invention. The layer structure of the illustrated sandwich composite component 2, unlike the sandwich composite component 1 according to FIG. 1, comprises a reinforcing layer 22 made of benzoxazine resin/glass fiber composite on each side of the core layer 10 made of polyurethane foam. A functional layer 50 made of aluminium foil is arranged directly on the outside of each reinforcing layer 22. The matrix of the reinforcing layer 22 integrally bonds the reinforcing layer 22 to the core layer 10 and to the functional layer 50. The sandwich composite component 2 needs no separating layers or additional adhesive plies, since the benzoxazine-resin matrix can be directly bonded to the aluminium foil. Alternatively, however, the sandwich composite component can also comprise a fluoroplastic ply as the upper decorative layer 33, which is bonded to the aluminium foil by an adhesive ply 40 made of a thermoset, as shown by the variant of the sandwich composite component 2' in FIG. 3.

FIG. 4 shows a schematic sandwich composite component 4 according to the invention as a further possible embodiment. The layer structure of this sandwich composite component 4, unlike the sandwich composite component 1 according to FIG. 1, was built up using a reinforcing layer 24 in the form of a laminate. A reinforcing layer 24 made of phenolic resin/glass fiber composite laminate was bonded on to each side of the core layer 10 made of polyurethane foam, i.e., a completely cured and no longer reactive laminate of phenolic resin/glass fiber composite was integrated into the layer structure. Because the phenolic resin in the laminate is completely cured before being incorporated into the layer structure, the laminate is bonded on to both sides of the core layer 10 by means of an adhesive ply 40 made of, e.g., a thermoset. A functional layer 50 made of aluminium foil is bonded to the structure on the outside of each reinforcing layer 24, in each case by means of a further adhesive ply 40 made of e.g. a thermoset. This variant of the sandwich composite component 4 needs no separating layers. Depending on the material of the adhesive ply, the layer structure can be cured at ambient temperature or at a higher temperature.

FIG. 5 shows a variation with a sandwich composite component 4' wherein, in addition to the layer structure according to FIG. 4, a further reinforcing layer 24 made of the phenolic resin/glass fiber composite laminate is applied externally on each side by means of a further adhesive ply 40 in each case.

FIG. 6 shows as a variant a sandwich composite component 1', wherein the functional layer 50 made of aluminium foil has been applied directly on to each side of the rigid foam core layer 10, which is located centrally in a cross-section of the sandwich composite component 1', by means of adhesive plies 40 made of a thermoset. Furthermore, a separating layer 30 made of a thermoplastic polymer is bonded on to the outside of each functional layer 50 by means of an adhesive ply 40 in each case. A reinforcing layer 20 made of phenolic resin/glass fiber composite prepreg is arranged on the outside of each separating layer 30. This layer structure of the sandwich composite component 1' according to FIG. 6 can also be pressed in a hot press in order to cure the matrix of the reinforcing layer 20 and the adhesive plies 40.

LIST OF REFERENCE NUMERALS

FIG. 1, FIG. 6:
1; 1' sandwich composite component
10 core layer
20 reinforcing layer
30 separating layer
40 adhesive ply
50 functional layer
FIG. 2, FIG. 3:
2, 2' sandwich composite component
10 core layer
22 reinforcing layer
50 functional layer
40 adhesive ply
33 decorative layer
FIG. 4, FIG. 5:
4; 4' sandwich composite component
10 core layer
24 reinforcing layer
40 adhesive ply
50 functional layer

The invention claimed is:

1. A sandwich composite component for the interior of a passenger aircraft, comprising a layer structure in the following order:
   a core layer made of polymer foam;
   a reinforcing layer comprising fiber composite material;
   a separating layer comprising a polyvinyl fluoride;
   an adhesive layer; and
   at least one functional layer;
   wherein these layers of the layer structure are bonded to each other, and
   wherein the fiber composite material of the reinforcing layer comprises a woven fabric made of fibers or a laid fabric made of fibers;
   wherein the fiber composite material of the reinforcing layer comprises a polymer matrix that has a higher density than the polymer foam of the core layer;
   wherein the at least one functional layer comprises a metal foil that has a smaller layer thickness than the reinforcing layer; and
   wherein the separating layer is arranged between the reinforcing layer and the functional layer.

2. The sandwich composite component according to claim 1, wherein the sandwich composite component meets fire protection requirements for aircraft interior materials according to an EASA specification with regard to flammability, smoke density and/or heat release.

3. The sandwich composite component according to claim 1, wherein the sandwich composite component meets requirements according to EASA specification CS 25.853 (d) with regard to heat release and heat release rate, and the sandwich composite component has a heat release rate HRR of less than or equal to 65 kW/m$^2$ and a heat release HR of less than or equal to 65 kW*min/m$^2$, determined according to CS 25.853 (d) and Appendix F, Part IV.

4. The sandwich composite component according to claim 3, wherein the sandwich composite component has an average heat release rate HRR of less than or equal to 45 kW/m$^2$ and/or an average heat release HR of less than or equal to 40 kW*min/m$^2$, determined according to CS 25.853 (d) and Appendix F, Part IV.

5. The sandwich composite component according to claim 1, wherein with regard to smoke emission properties, the sandwich composite component has an average specific optical smoke density Ds of less than 100 after 4 minutes determined according to ASTM test method F814-83.

6. The sandwich composite component according to claim 1, wherein the reinforcing layer is arranged between the functional layer and the core layer in the layer structure.

7. The sandwich composite component according to claim 1, wherein the functional layer consists of an aluminum foil having a thickness of between 7 μm and 300 μm.

8. The sandwich composite component according to claim 1, wherein the core layer is prefabricated as a rigid foam board or a rigid integral foam board.

9. The sandwich composite component according to claim 1, wherein the sandwich composite component has a weight per unit area of less than 2.5 kg/m$^2$, wherein the core layer has a density of 20 to 300 kg/m$^3$.

10. The sandwich composite component according to claim 1, wherein the core layer is made from or consists of polyurethane foam.

11. The sandwich composite component according to claim 1, wherein the core layer is made from a PVC, PET, EPS, PE and/or PMI foam.

12. The sandwich composite component according to claim 1, wherein the core layer is made from or consists of a combination of at least two foams selected from: polyurethane, PVC, PET, EPS, PE or PMI foam.

13. The sandwich composite component according to claim 1, wherein the layer structure comprises at least one functional layer made of metal foil on each side of the core layer.

14. The sandwich composite component according to claim 1, wherein the reinforcing layer comprises a fiber composite material, which is made from a prefabricated prepreg.

15. The sandwich composite component according to claim 1, wherein the metal foil of the functional layer comprises perforations.

16. An interior composite panel of an aircraft, the interior composite panel comprising or consisting of a sandwich composite component according to claim 1.

17. The sandwich composite component according to claim 1, wherein the layer structure has at least the following layers in the following order:
   the at least one first functional layer as a first functional layer;
   the adhesive layer;
   the separating layer as a first separating layer;
   the reinforcing layer as a first reinforcing layer made of fiber composite material;
   the core layer made of polymer foam,
   a second reinforcing layer made of fiber composite material;
   a second separating layer;
   a second adhesive layer; and
   at least one second functional layer.

18. The sandwich composite component according to claim 1, wherein at least one of the core layer, the reinforcing layer, the separating layer, and the adhesive layer includes a flame retardant or a flame inhibitor.

19. A sandwich composite component for the interior of a passenger aircraft, comprising a layer structure in a sandwich construction, wherein the layer structure is in the following order:
   a first functional layer;
   an adhesive layer;
   a first separating layer comprising a polyvinyl fluoride;
   a first reinforcing layer;
   a core layer having a first side and a second side, the first reinforcing layer is on the first side;
   a second reinforcing layer on the second side of the core layer;
   a second separating layer comprising a polyvinyl fluoride; and
   a second functional layer, and
   wherein the first and the second functional layers consist of an aluminum foil, which has a smaller layer thickness than the first reinforcing layer.

20. A sandwich composite component for the interior of a passenger aircraft, comprising a layer structure in a sandwich construction, wherein the layer structure comprises the following layer sequence:
   a first functional layer comprising an aluminum foil;
   a first adhesive ply;
   a first separating layer comprising a thermoplastic layer having a polyvinyl fluoride;
   a first reinforcing layer made of fiber composite material;
   a core layer made of polymer foam,
   a second reinforcing layer made of fiber composite material;
   a second separating layer comprising a thermoplastic layer having a polyvinyl fluoride;
   a second adhesive ply;
   a second functional layer comprising an aluminum foil, and
   wherein the layers of the layer structure are bonded to each other.

* * * * *